(No Model.) 2 Sheets—Sheet 1.

J. J. ROGERS & O. S. KENNEDY.
SEEDING ATTACHMENT FOR DISK HARROWS.

No. 406,147. Patented July 2, 1889.

Witnesses

Inventors
Jonathan J. Rogers and
Oliver S. Kennedy.
By their Attorneys (No Model.) 2 Sheets—Sheet 2.
J. J. ROGERS & O. S. KENNEDY.
SEEDING ATTACHMENT FOR DISK HARROWS.
No. 406,147. Patented July 2, 1889.
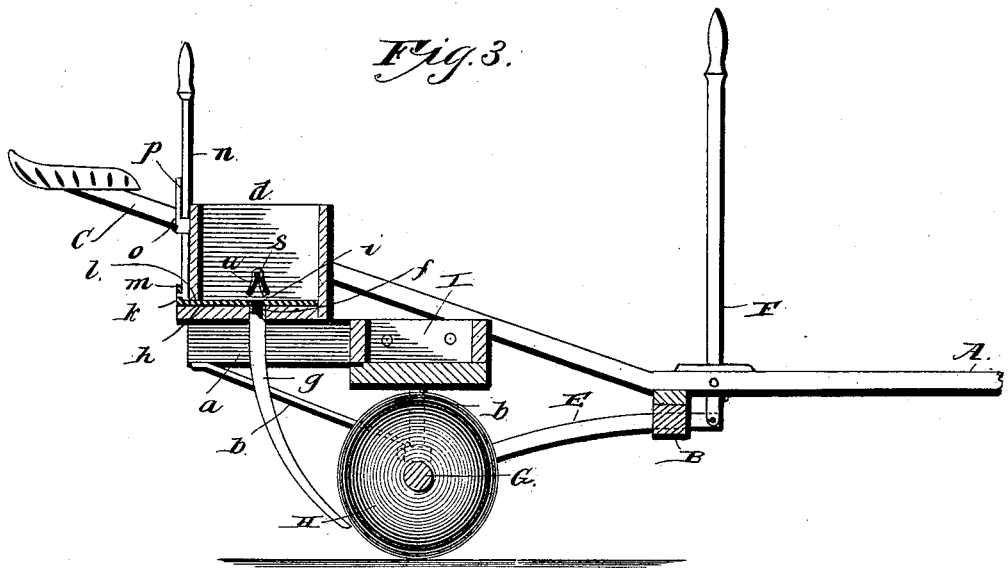
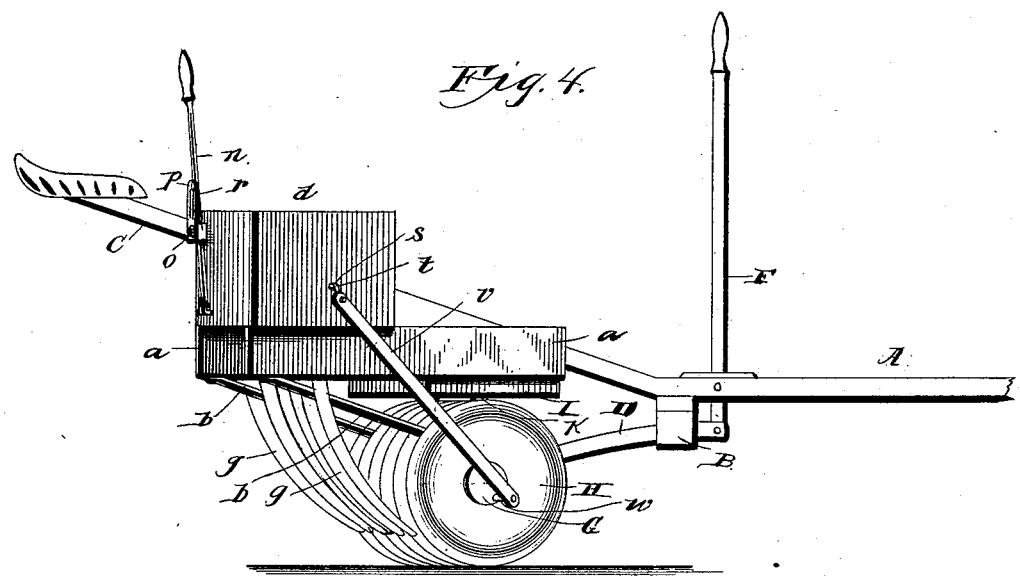
Witnesses
Geo. Y. Thorpe
J. W. Garner
Inventors
Jonathan J. Rogers
and
Oliver S. Kennedy
By their Attorneys
N. PETERS, Photo-Lithographer, Washington, D. C.

UNITED STATES PATENT OFFICE.

JONATHAN JUDSON ROGERS AND OLIVER SYLVESTER KENNEDY, OF FORT WORTH, TEXAS.

SEEDING ATTACHMENT FOR DISK HARROWS.

SPECIFICATION forming part of Letters Patent No. 406,147, dated July 2, 1889.

Application filed November 13, 1888. Serial No. 290,718. (No model.)

*To all whom it may concern:*

Be it known that we, JONATHAN JUDSON ROGERS and OLIVER SYLVESTER KENNEDY, citizens of the United States, residing at Fort Worth, in the county of Tarrant and State of Texas, have invented a new and useful Improvement in Seeding Attachments for Disk Harrows, of which the following is a specification.

Our invention relates to an improvement in seeding attachments for disk harrows, whereby the operation of harrowing the stubble and seeding-grain may be accomplished simultaneously; and our invention consists in the peculiar construction and combination of devices, that will be more fully set forth hereinafter, and particularly pointed out in the claim.

Figure 1:
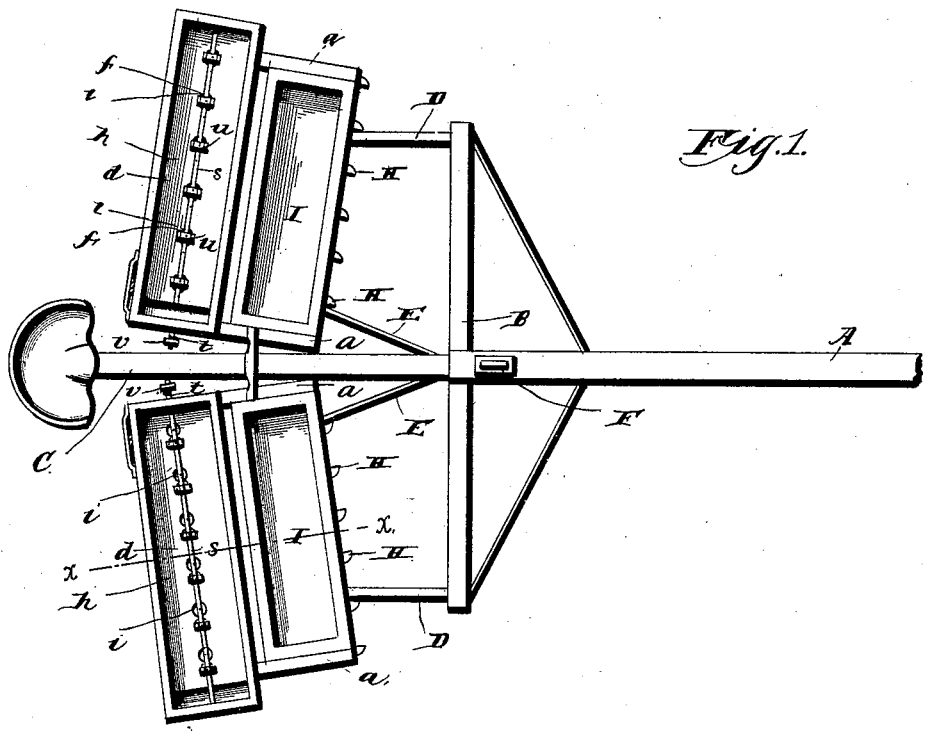
Figure 2:
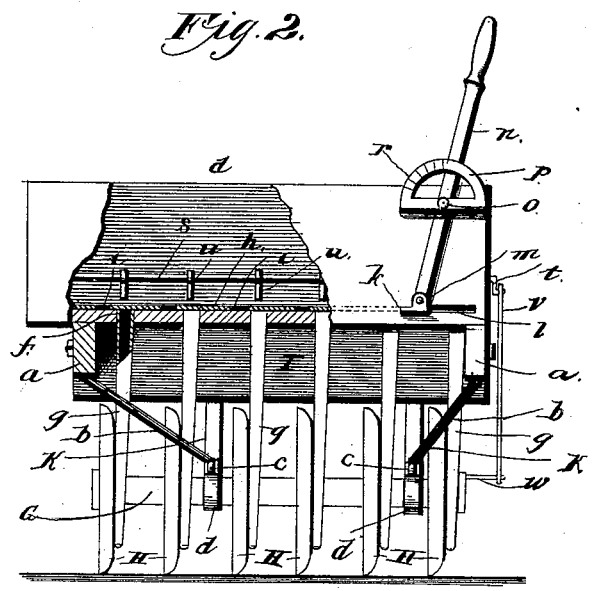

In the accompanying drawings, Figure 1 is a top plan view of a disk harrow provided with grain-seeding attachments embodying our improvements. Fig. 2 is a rear elevation of one side of the harrow provided with our grain-seeding attachment, the latter being partly in section. Fig. 3 is a sectional view taken on the line $x\,x$ of Fig. 1. Fig. 4 is a side elevation of a disk harrow provided with our improved grain-seeding attachment.

The disk harrow is of the usual construction and comprises the tongue A, the cross-bar B, seat-bar C, draft-rods D, longitudinally-movable draft-rods E, the lever F, connected thereto, the obliquely-arranged axles G, secured in the draft-rods D E, the revolving concavo-convex harrow-disks H on the axles, and the weight-boxes I, secured above the axles by vertical standards K.

We will now describe our improved grain-seeding attachment.

$a$ represents rearward-extending arms, which are bolted to the ends of the weight-boxes I and have their rear ends supported by brace-rods $b$, the latter having their rear ends bolted to the under sides of the arm $a$ and having their lower front ends secured to the standards K by clamps $c$.

$d$ represents seed boxes or hoppers, which are supported on the rearward-extending arms $a$ and are secured thereto by screws or bolts. In the bottom of each hopper or seed-box, in the center thereof and at a suitable distance apart, are discharge-openings $f$, from which depend grain-spouts $g$, the latter having their lower ends curved forward and arranged in proximity to the harrow-disks, as shown. On the bottom of each hopper is a regulating slide-plate $h$, provided with openings $i$, adapted to register with the openings $f$ and to move past the same to any desired extent to cut off said openings $f$ either entirely or partly, and thereby prevent seed from being drilled or regulate the quantity of seed sowed on a given area. From the rear inner corner of each slide-plate $h$ projects an arm $k$, that works in a longitudinal slot $l$ in the rear side of the hopper and has an ear $m$, to which is pivoted the lower end of a hand-lever $n$. Each lever $n$ is fulcrumed on the bolt $o$, and arranged concentrically with the bolt are dials $p$, provided with graduate-scales $r$, which serve in connection with the levers $n$ to indicate the position of the slide-plates in the hoppers, the levers adapting the slide-plates to be moved to any required adjustment, as will be readily understood.

$s$ represents rock-shafts, which are journaled in the end walls of the hoppers and extend entirely through the same, and are each provided at one end with a crank-arm $t$ and have stirrer-arms $u$, arranged in the same vertical planes with the discharge-openings $f$.

To the outer end of each axle G is secured a crank-arm $v$, and the said crank-arms are connected to the crank-arms $t$ of rock-shafts $s$ by pitmen $w$, which serve, when the harrow is rotating, to impart oscillating motion to the shaft $s$, and hence cause the stirrer-arms $u$ to vibrate and feed the seeds in the hoppers to the seed-spouts when the slide-plates H are arranged with their openings $i$ registering with the discharge-openings $f$.

A grain-seeding attachment thus constructed is extremely cheap and simple, may be very readily attached to and disconnected from a disk harrow, and will be found of great practical utility on a farm.

Having thus described our invention, we claim—

The combination of the axles having their outer ends journaled in stationary and their inner ends in longitudinally-adjustable bearings and provided with the harrow-disks, the weight-boxes I, mounted on vertical standards above said axles and having rearward-extending arms or braces, the seed-boxes mounted upon said braces above and in rear of the weight-boxes and having downwardly-extending forwardly-curved drill-tubes, the adjustable seed-slides, the rock-shafts having fingers or agitators, and the pitman connecting cranks upon the rock-shafts with cranks upon the axles, substantially as set forth.

In testimony that we claim the foregoing as our own we have hereto affixed our signatures in presence of two witnesses.

JONATHAN JUDSON ROGERS.
OLIVER SYLVESTER KENNEDY.

Witnesses:
W. S. PENDLETON,
E. G. SENTER.